Figure 1:
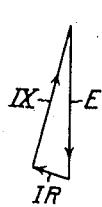
Figure 2:
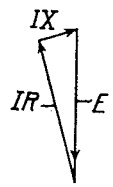

J. I. HULL.
DOUBLE RANGE REGULATING SET FOR CONTROLLING SPEED OF INDUCTION MOTORS.
APPLICATION FILED AUG. 8, 1916.

1,306,594.  Patented June 10, 1919.
3 SHEETS—SHEET 1.

Inventor:
John I. Hull,
by Allen S. Davis
His Attorney.

J. I. HULL.
DOUBLE RANGE REGULATING SET. FOR CONTROLLING SPEED OF INDUCTION MOTORS.
APPLICATION FILED AUG. 8, 1916.

1,306,594.

Patented June 10, 1919.
3 SHEETS—SHEET 3.

Inventor:
John I. Hull,
by Albert E. Davis
His Attorney.

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

DOUBLE-RANGE REGULATING SET FOR CONTROLLING SPEED OF INDUCTION-MOTORS.

1,306,594.     Specification of Letters Patent.     Patented June 10, 1919.

Application filed August 8, 1916. Serial No. 113,816.

*To all whom it may concern:*

Be it known that I, JOHN I. HULL, a citizen of the United States, residing at Schenectady, county of Schenectady, State of New York, have invented certain new and useful Improvements in Double-Range Regulating Sets for Controlling Speed of Induction-Motors, of which the following is a specification.

My invention relates to an arrangement for controlling the speed of induction motors, and has for its objects the provision, in connection with a system comprising an induction motor, a regulating machine concatenated therewith, and an exciting system for said machine, of new and improved methods of operation and means whereby the speed of the induction motor may be regulated to have any desired speed between a speed considerably below synchronism and a speed considerably above synchronism, at which its operation will be stable under all conditions, and whereby the desired induction motor characteristics will be maintained at all regulated speeds.

It is well known that the speed of an induction motor may be readily and economically controlled by regulating the field of a commutator machine which is connected in cascade, or concatenated, with the induction motor. Various arrangements utilizing this principle have been devised for carrying the speed of the induction motor through synchronism, but none of these have been found sufficiently practical to warrant its adoption for extensive commercial use. Some arrangement for accomplishing this object is very desirable, however, since it enables a very considerable reduction in the size of the regulating machines for a given speed range.

Furthermore, even in known commercial systems, wherein the induction motor is intended to operate at speeds below synchronism only, it is often desirable to obtain speeds closer to synchronism than have hitherto been possible. In such systems wherein the field winding of the commutator, or regulating, machine, which is concatenated with the induction motor whose speed is to be regulated, is excited by a voltage having a more or less fixed phase with respect to the slip ring voltage of the induction motor, as for example, where the regulating machine is excited in whole or in part from the induction motor slip rings, the operation of the induction motor at regulated speeds in the neighborhood of synchronism becomes uncertain and unstable due largely to the difference which exists between the phase of the voltage of the regulating machine and the slip ring voltage and the variation in the magnitude and phase of the field flux and voltage of the regulating machine which results upon a departure of the induction motor speed, caused by any external influence, from the regulated speed.

I have discovered, however, that by exciting the regulating machine so that the desired phase relation between the voltage thereof and the slip ring voltage of the induction motor is substantially maintained and so that the field flux and voltage of the regulating machine remain approximately constant at values corresponding to the regulated speeds notwithstanding the induction motor speed is caused, by any external influence, to depart from its regulated speed, the induction motor may be regulated in a reliable and stable manner over a range comprehending subsynchronous, synchronous and supersynchronous speeds. To this end, I have provided means for supplying the field winding of the regulating machine with an electromotive force, which has the proper magnitude and phase to balance the reactive drop therein and which varies proportionately to the slip voltage and frequency, and with an electromotive force, which has the proper magnitude and phase to balance the ohmic drop therein and which remains practically unaffected by variation in the slip voltage and frequency. One arrangement whereby this may be practically accomplished involves the use of a second commutator machine or exciter between the brushes of which and the slip rings of the induction motor are connected the field windings of the first mentioned commutator, or regulating, machine. The field winding of this exciter is connected to the slip rings of the induction motor and to a frequency changer or "ohmic drop exciter" of the type shown in the Milch Patent #1,085,511. This ohmic drop exciter has its slip rings connected with the main source of supply and is arranged to be rotated at a speed proportional to the speed of the main induction motor so as to run at its synchronous speed when the main induction motor runs at synchronous speed. Adjustable resistances are employed in series with the field windings of the regulating machine and of the exciter. Resistance is also preferably inserted between the ohmic drop exciter and the field windings of the exciter. Other features of this arrangement will be explained as this specification progresses. Another arrangement whereby the objects of my invention may be practically accomplished will be hereinafter described.

Figure 6:
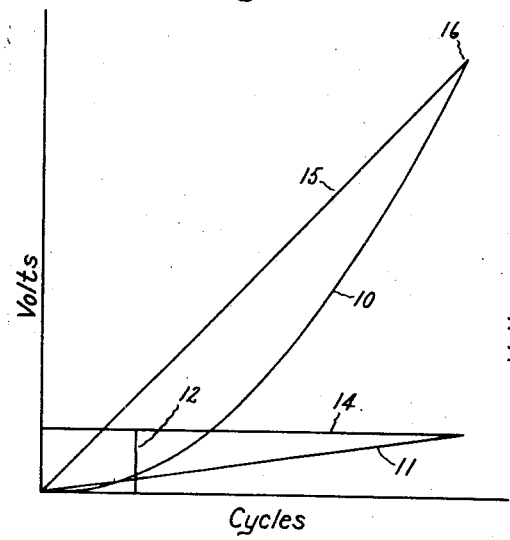
Figure 7:
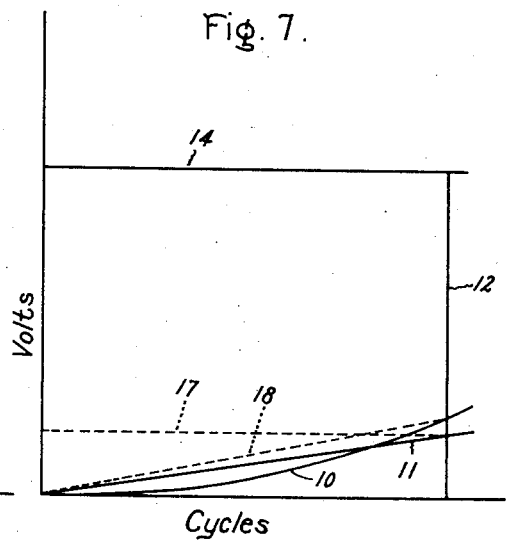
Figure 8:
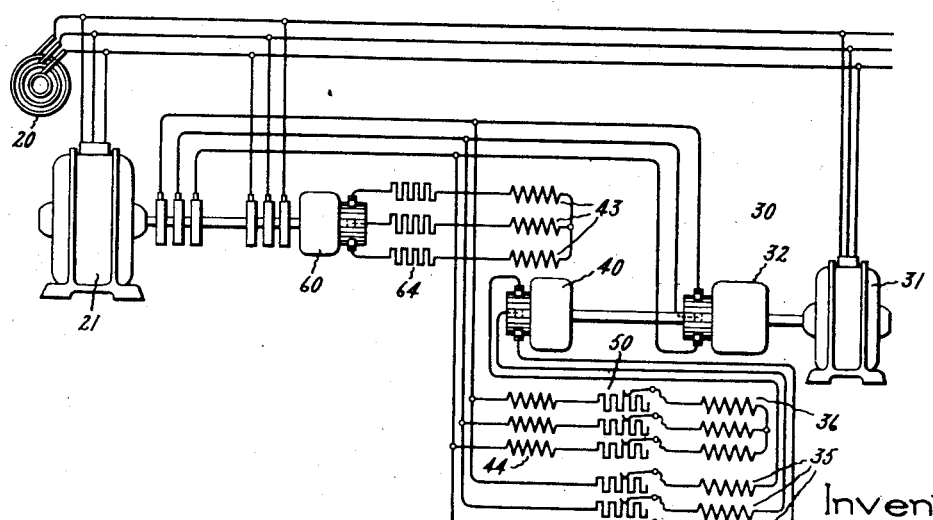
Figure 9:
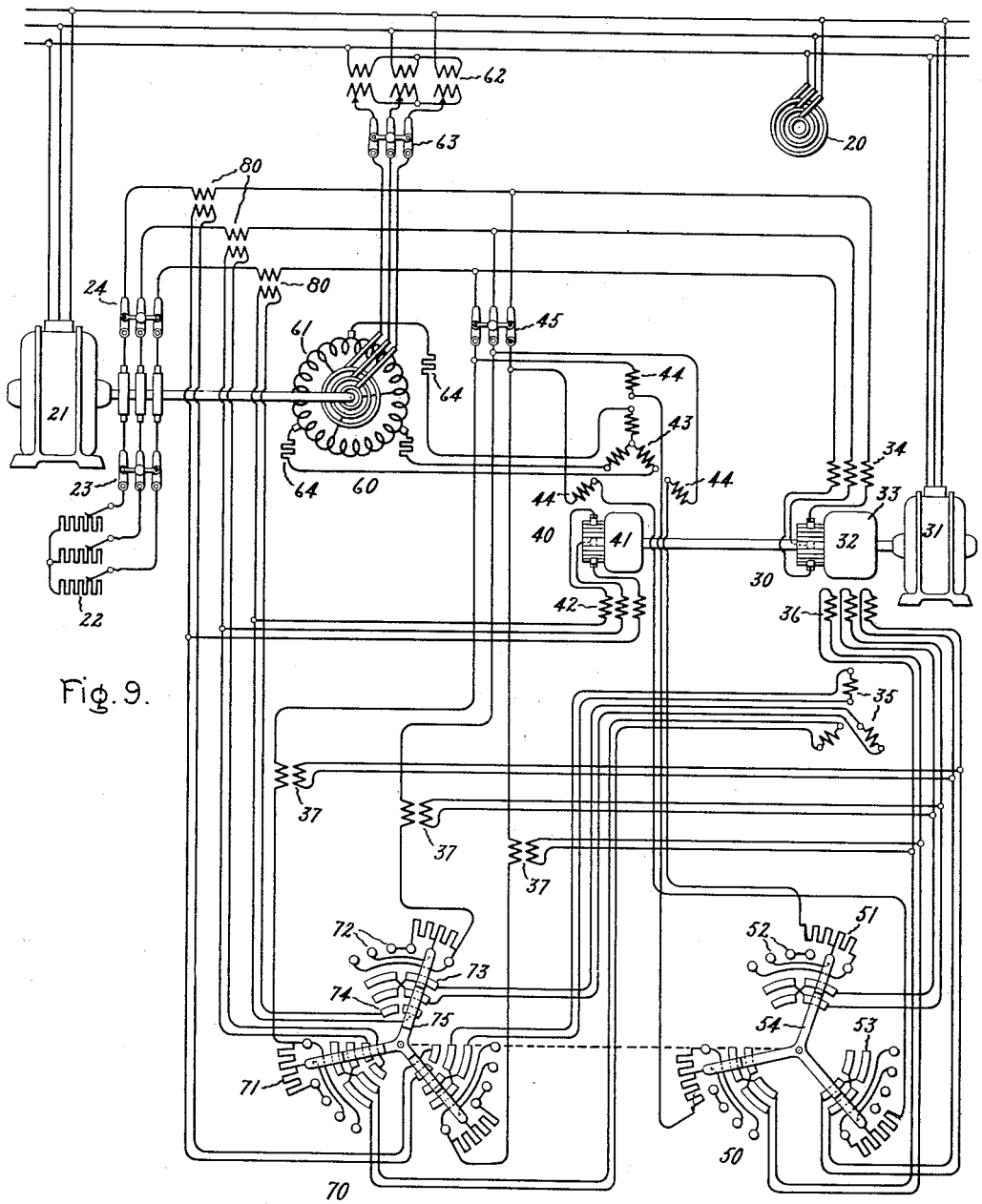
Figure 10:
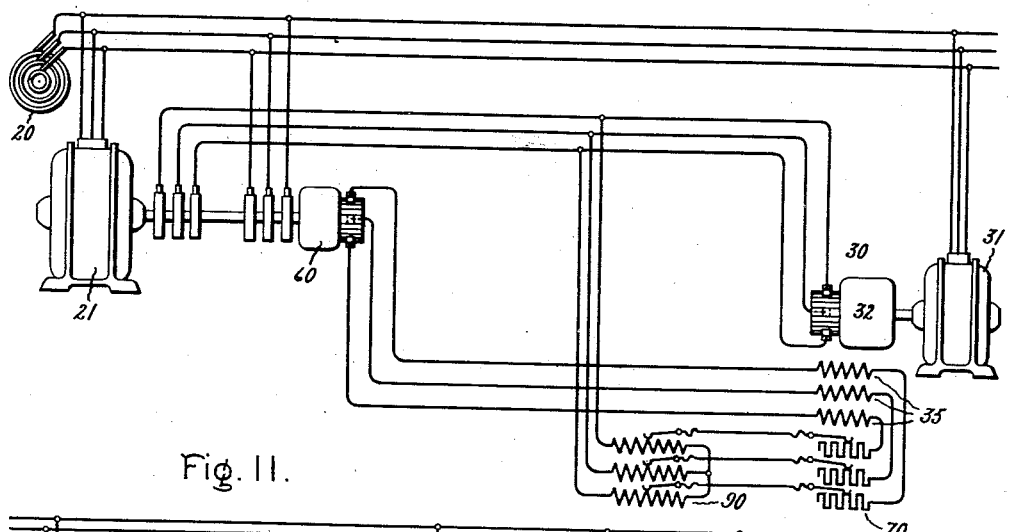
Figure 11:
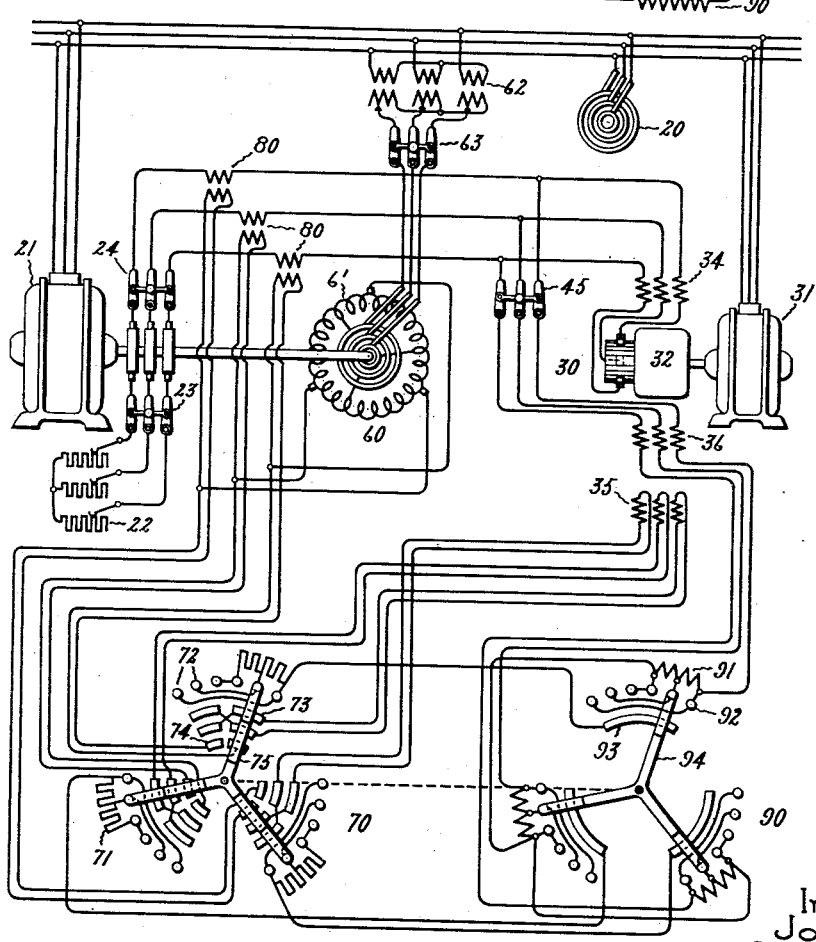

My invention will be more readily understood by reference to the following specification, when taken in connection with the accompanying drawing in which:

Figures 1 to 5 inclusive are explanatory vector diagrams; Figs. 6 and 7 are explanatory curves; Fig. 8 is a simplified diagram of one form of my system; Fig. 9 is a diagrammatic view showing the apparatus and the connections employed in the form of my system corresponding to Fig. 8; and Figs. 10 and 11 show another arrangement embodying my invention.

Figure 3:
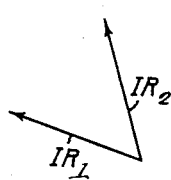

If we consider an arrangement of the kind which has been commonly employed, such as one wherein an exciter for the commutator machine receives its excitation only from the slip rings of the main induction motor, or one wherein the commutator motor receives its excitation from the slip rings through a transformer, then the relations of applied voltage E, ohmic drop IR, and reactive drop IX, will be represented by the vector diagram shown in Fig. 1. If such an arrangement could be operated in the neighborhood of synchronism, the relations of these quantities would be shown by the vector diagram in Fig. 2. In Fig. 3, I have drawn vectors $IR_1$ and $IR_2$, which represent the relative phases of the corresponding ohmic-drop vectors in Figs. 1 and 2. From an inspection of this figure, it will be evident that there is a wide variation in the phase of the field current, which is in phase with the ohmic drop, and consequently in the phase of the flux of the commutator machine, between operation relatively remote from synchronism and operation in the immediate neighborhood of synchronism.

Figures 4, 5:
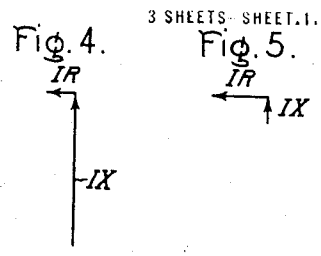

If, now, we consider that by some means it is possible to maintain a flux of constant phase, then during operation remote from synchronism the relative magnitude of the reactive and ohmic drops in the field circuits of the commutator machine, could be represented by the diagram of Fig. 4, and during operation near synchronism the relative magnitude of these quantities could be represented by the vector diagram of Fig. 5. The scales to which these quantities have been drawn are not the same in the two figures. It will be seen, however, that during operation at a speed remote from synchronism, the reactive drop is very markedly predominant, whereas in the operation at a speed close to synchronism, the reactive and ohmic drops may become more nearly equal or even interchange their relative magnitudes.

In order to more readily explain the theory of operation upon which my invention is based, I will first describe the essential pieces of apparatus employed in one particular arrangement as shown in Fig. 8. From this figure it will be seen that power is supplied from an alternating current source 20 to the primary winding of the main induction motor 21. A regulating set 30 is then provided and will ordinarily comprise an induction machine 31 connected to the same source of supply, a regulating commutator machine 32, and an exciter 40. It will be understood that my invention is equally applicable to other well known arrangements such as that in which the commutator machine is directly connected to the main motor. This regulating machine will be provided with an exciting winding 35 and if desired, interpole windings 36. The exciter 40 is here shown as provided with exciting field windings 43 and 44, the latter winding being controlled by the exciter field rheostat 50. The exciting winding 43 is supplied from a frequency changer 60 which I shall hereinafter term an "ohmic-drop exciter." This ohmic-drop exciter is arranged to be rotated at a speed proportional to that of the main induction motor, and may conveniently be mounted upon the same shaft therewith. Current is supplied to its slip rings from the main source of supply, and a fixed resistance 64 is preferably interposed between the brushes of the ohmic-drop exciter 60 and the exciting winding 43. It will be seen that the exciting winding 35 of the regulating motor is connected in series between the brushes of the exciter 40 and the slip rings constituting the terminals of the secondary windings of the main induction motor. In this circuit I have provided a rheostat 70, which I shall call the "ohmic-drop rheostat." Although I have illustrated my invention as applied to three phase apparatus, it will be understood that it is equally applicable to apparatus of any number of phases.

In the systems now in commercial use, the ohmic-drop exciter and the ohmic-drop rheostat are omitted and the exciting winding of the exciter is usually arranged in a single part. In this particular case, the winding has been divided into two parts merely for convenience of design, but such division is not an essential feature of my improved arrangement. In the known commercial system, therefore, the excitation of the regulating motor may be provided in part by the slip voltage of the main induction motor, and in part by the voltage generated in the exciter. This latter voltage is determined by means of a rheostat. Now, if the ohmic-drop be neglected, the voltage which it is desired to apply to the exciting winding of the regulating motor for various speeds, and hence for various slip frequencies, varies with the square of the slip frequency and hence is determined by a parabolic curve of the form shown at 10 in Fig. 6 where the ordinates represent voltages and abscissæ slip frequencies. On the other hand the slip voltage of the main induction motor varies directly with the slip frequency, and may accordingly be represented by the straight line 15. It will then be seen that it is only necessary to provide an exciter, to buck the slip voltage, which is capable of producing a voltage of proper phase and of a magnitude whose maximum value is represented by the maximum difference of ordinates of the curves 10 and 15. Such an arrangement greatly reduces the size of the exciter, as has already been pointed out in the German patent to Brown, Boveri & Co., #241,188, and, as explained in this patent, the size may be still further reduced by so designing the pieces of apparatus that the curves shall cross at a point corresponding to approximately five-sixths of the maximum speed range and arranging the exciter to either buck or boost the slip voltage applied to the regulating motor field.

While such an arrangement is very economical and has many advantages, it nevertheless results in producing a condition whereby at speeds corresponding to low slip frequencies, that is to say at speeds close to synchronism, the difference between the slip voltage and the exciter voltage, which difference is to be applied to the exciting winding of the regulating motor, is only a small fraction of either one of these voltages. It follows that an error of 10% in the adjustment of the exciter voltage, may easily give an error of 100% in the voltage applied to the field winding of the regulating motor. Furthermore, the ohmic drop component of this applied voltage is comparatively large at speeds close to synchronism. This results in making the system especially sensitive to load changes.

This question of the relative magnitudes of the ohmic and reactive drops will be more clearly brought out by the curves in Figs. 6 and 7. In Fig. 6 the curve 10 may also be taken to represent the variations in the magnitude of reactive drop in the field circuit of the commutator regulating machine, with various speed settings and hence various slip frequencies, while curve 11 represents the corresponding ohmic drop in the field circuit of this regulating machine of the ordinary commercial systems. Fig. 7 is an enlarged view of the lower left-hand portion of these curves, representing the conditions of operation in the immediate neighborhood of synchronism. In the commercial systems involving the use of a commutator exciter, even neglecting the ohmic drop, it would be found impossible in actual practice to regulate the speed of the induction motor all the way to synchronism because of the unstable conditions, already pointed out, when practically all of the slip ring voltage is balanced by the exciter voltage in order to secure the very small difference taken by the field of the regulating motor close to synchronism. In the arrangement which I am about to describe, I have, therefore, avoided the necessity of exactly balancing the small reactive drop in the field of the regulating commutator machine at speeds very close to synchronism and have controlled the regulating commutator machine from the main motor speed corresponding to the vertical line 12, for example, to synchronous speed, by controlling, with the additional resistance of the ohmic-drop rheostat, the ohmic-drop component in the field circuit of said machine.

Under ordinary conditions, with the commercial systems now in use, such an arrangement would be very unsatisfactory because the ohmic drop is large enough without any artificial increase to be a very disturbing factor. I have, however, artificially increased the ohmic-drop component of the voltage consumed in the field circuit of the commutator machine 32, including the resistance of the armature winding of the exciter 40, by including therein the ohmic-drop rheostat 70. This component will be supplied by the arbitrary voltage determined by the excitation of the exciting winding 43 furnished from the ohmic-drop exciter 60 and will, if maintained constant, be represented by the horizontal line 14, Figs. 6 and 7. I then make this ohmic-drop exciter of such capacity, for example, that it can supply the entire ohmic-drop at full regulation, when the rotation electromotive force of the commutator regulating machine is a maximum, this drop being represented by the ordinate of the end of curve 11. As a consequence, operation close to synchronism, as represented by the portion of the curves shown in Fig. 7, will be accompanied by an ohmic drop, as shown by line 14, which is very large compared with the reactive drop as shown by curve 10, and perfect control of the current in the winding 35 may be obtained by manipulation of the ohmic-drop rheostat 70. And now, inasmuch as the ohmic drop in the field circuit of the regulating machine 32 is very large as compared with the reactive drop, a discrepancy of as much as 100% between the theoretically exact electromotive force needed to balance the latter and its actual value, will have practically no effect upon the flux in the winding 35. It follows that, by the proper manipulation of both the exciter field rheostat 50, to thereby control the reactive-drop balancing component, and the ohmic-drop rheostat 70, to thereby control the ohmic-drop component of the voltage consumed in the field circuit of the commutator machine 32, the speed of the main motor may be adjusted to any desired value and kept there indefinitely.

If, during operation close to synchronism, the speed and hence the slip of the main induction motor, vary, due to some cause other than adjustment of the rheostats, from the maximum amount indicated in Fig. 7 to synchronism, while the excitation of the field of the commutator machine 32 is maintained constant, the variation in the ohmic and reactive drops will be along the dotted lines 17 and 18. It will be noted that the reactance drop varies in proportion to the slip while the ohmic drop remains constant.

In the systems in commercial use, a great departure from any cause from the speed for which the motor is adjusted may cause the flux of the commutator motor to be entirely different from its intended value. For example, if, when the adjustment is for full regulation, some great force push the main motor into synchronous speed, the flux of the commutator motor will vanish and the main motor will fail to return to its proper speed after the force has been removed. With my system, the flux of the commutator machine remains approximately constant notwithstanding the induction motor is forced to rotate at synchronous speed since, although all the reactance drops and their balancing components have disappeared, nevertheless the ohmic drops and their balancing components are the same at zero frequency as at the frequency corresponding to the desired regulated induction motor speed. As a result the induction motor will strongly tend to return to its regulated speed at which the induction motor slip voltage is approximately equal to the voltage developed by the regulating machine. In fact the induction motor will tend to maintain its regulated speed throughout the entire range of speed regulation since the field flux of the regulating machine, and hence the voltage developed thereby, having been determined by proper adjustment of the rheostat 50 and rheostat 70, will remain approximately constant notwithstanding variation in the speed of the induction motor caused by load or similar changes. In order to obtain any desired regulated speed, the rheostats 50 and 70 are simultaneously adjusted so that the current traversing the exciting winding 35 will cause the regulating machine 30 to develop a voltage approximately equal to the slip voltage of the induction motor when operating at its regulated speed and hence so that, for any value of exciting current, the ohmic drop in the circuit of the field winding of the regulating machine 30 will approximately equal the ohmic drop balancing component supplied by the exciter 40 and the reactive drop in the circuit of the field winding of the regulating machine 30, composed of the reactive drop of the field winding itself and that produced by the exciter 40, will approximately equal the slip voltage of the induction motor. With the rheostats 50 and 70 in corresponding adjusted positions the current in the field winding 35 approximates a definite value irrespective of the speed of the induction motor since the ohmic drop balancing component applied to the field winding 35 is independent of the speed and, although the reactive drop balancing component applied to the field winding 35 is proportional to the slip voltage, the reactive drop for a given current is proportional to the slip frequency. In adjusting the rheostats 50 and 70 this proportionality, between the reactive drop in the field winding 35 and the slip voltage of the induction motor, and the ohmic drop balancing component applied to the field winding 35 are varied. Also if it be assumed that the induction motor assumes promptly its regulated speeds upon the adjustment of the rheostats 50 and 70, such adjustment will cause the reactive drop in the field winding of the regulating machine to vary as the square of the slip frequency, the sum of the reactive drop in the field winding and that artificially produced by the exciter 40, which sum equals the reactive drop of the circuit of the field winding, being equal to slip voltage, and will cause the ohmic drop in the circuit of the field winding to remain approximately constant and equal to the ohmic drop balancing component supplied by the exciter 40.

Having now described the principle of operation upon which my invention depends, I will describe one actual embodiment in greater detail. As illustrated in Fig. 9, it will be seen that the system involves the same essential elements as shown in Fig. 8. In addition, a starting resistance 22 is adapted to be connected to the secondary winding of the main induction motor 21 by means of a switch 23. A switch 24 is also interposed between this secondary winding and the brushes of the commutator machine 32. This regulating commutator machine 32 is provided with a commuted armature winding 33 and a compensating winding 34, this latter winding being connected in series between the brushes and the slip rings of motor 21. The regulating machine is also provided with an exciting winding 35 and interpole windings 36. The commutator exciter 40 has a commuted armature winding 41, and a compensating winding 42 connect- ed in series with its brushes. As illustrated in Figs. 8 and 9, the exciting winding is divided into two portions, 43 and 44, the latter of which is connected to the slip rings of the main induction motor through a disconnecting switch 45. In series with this winding is the exciter field rheostat 50, provided with sections of resistance 51, connected to the studs 52. The interpole windings 36 are connected to the contact segments 53 and an operating arm 54 is provided for connecting the outer segments to the studs 52 and for short-circuiting the inner segments. The other section 43 of the exciting winding of the commutator exciter is connected to the brushes of the ohmic-drop exciter 60. This ohmic-drop exciter is provided with a commuted winding 61, connected by means of slip rings to the main source of supply through a transformer 62 arranged to arbitrarily determine the voltage of said ohmic-drop exciter, a disconnecting switch 63 being interposed. In series between the brushes of the ohmic-drop exciter 60, and the exciting winding 43 are fixed resistances 64, whose purpose will be later explained. The exciting winding 35 of the commutator machine is connected to the slip rings of the main induction motor through the ohmic-drop rheostat 70. The operating arms of the rheostats 50 and 70 are preferably mechanically connected. This rheostat 70 is of similar construction to the exciter-field rheostat, and is provided with sections of resistance 71 connected to studs 72. The terminals of each phase of the exciting windings 35 are connected to contact segments 73, whereby one terminal of each phase is connected by means of the outer end of the operating arm 75 to a certain point of the corresponding resistance 71, and the other terminal is connected to the brushes of the exciter 40 through contact segments 74. During operation below synchronous speed, when the arm 75 is in contact with one-half of the segments 74, the connection will be directly to the terminals of the exciter 40.

When operating above synchronous speed with the operating arm 75 in contact with the other portion of the segments 74, the connection to the exciter brushes will pass through the secondary windings of a series reactance transformer 80, which I shall call a "bulging transformer." The primary windings of this transformer are connected in series with the mains leading from the slip rings of the main induction motor to the brushes of the commutator regulating machine 32. I have also provided a series transformer 37, whose secondary windings are connected in shunt with the interpole windings 36 and whose primary windings are connected in series with the mains leading from the slip rings of the main induction motor to the brushes of the commutator exciter 40.

I will now proceed to describe the method of operation of my novel system as shown in Figs. 8 and 9. Switches 24, 45 and 63 will preferably be opened and the main induction motor will then be started by manipulation of the starting resistance 22. When an operating speed has been reached, supposing that the regulating set 30 is already in motion, the switch 23 will be opened and the switches 24, 45 and 63 will be closed. The rheostats 50 and 70, which will preferably be mechanically connected so that they may be simultaneously operated, may, for example, be in their extreme right-hand position. All of the resistance 51 will then be inserted in series with the section 44 of the exciting winding of the commutator exciter 40, and as a result the voltage furnished by this portion of the exciting winding of the exciter will be reduced to practically zero. All of the reactive drop in the field circuit of the commutator regulating machine 32, will then be furnished from the slip rings of the main induction motor, and the speed of the main motor will be reduced as far below synchronous speed as is possible without reversing the excitation of the commutator exciter 40. The operating speed will then correspond to that of the point 16 in Fig. 6. It will be noted that at this speed, all of the resistance of the ohmic-drop rheostat 70 has been cut out, and consequently the total ohmic drop in the field circuit of the commutator machine 32 is used up in the exciting windings 35, and the resistance of the armature winding 41 and the compensating winding 32.

Rotation of the operating arms 54 and 75 in a counter-clockwise direction will increase the excitation of the exciting winding 44, thereby causing the voltage delivered by the exciter 40 to oppose the slip voltage of the main motor, and reduce the applied voltage balancing the reactive drop in the field circuit of the commutator regulating machine. Because of the fact that the reactive drop is the predominating component, the controlling effect will be obtained chiefly from the control thereof by the rheostat 50. This operation will reduce the current in the exciting winding 35, and hence the generated voltage of the machine 32 which must be balanced by the slip voltage of the main motor 21, thereby causing an increase in the speed of said motor. At the same time, a section of the resistance 71 has been inserted in the field circuit of the commutator machine 32, so that as the current in the field winding 35 has been reduced, the ohmic-drop of the field circuit will have been arbitrarily controlled and preferably maintained constant by this artificial increase in the resistance of said circuit. As has already been pointed out, this ohmic-drop balancing component of the voltage applied to the field circuit is supplied from the commutator exciter 40, by means of the constant excitation furnished to the portion 43 of the exciting winding from the ohmic-drop exciter 60. Inasmuch as the useful alternating current flux in the armature of the commutator exciter is threading this section 43 of the exciting winding, a voltage would be introduced therein by transformation which would tend to interfere with the voltage delivered by the ohmic-drop exciter. In order to make negligibly small any such interference and thereby make the current delivered by the ohmic-drop exciter 60 as nearly constant as possible, I have interposed a substantial resistance 64. By making the portion 43 of the exciting winding a separate winding, it is possible to more advantageously design the exciter 60 as regards the voltage to be applied to said winding. As is well understood in the art, the fact that the ohmic-drop exciter runs at a speed proportional to that of the main induction motor, and here at the same speed, forces the frequency of the current delivered by said exciter to be correct, and it is only necessary to correctly adjust the relative position of the commuted winding 61 with respect to the secondary winding of the main motor 21, in order that the phase relations shall be correct.

Further rotation of the rheostats 50 and 70 in a counter-clockwise direction will decrease the resistance 51 in the exciter-field circuit, and increase the resistance 71 in the field circuit of the commutator machine 32. As synchronous speed is approached, the reactive-drop balancing component of the voltage applied to the field circuit of the regulating motor, will become subordinate to the ohmic-drop balancing component as has already been pointed out. As a consequence the speed of the main motor will be controlled chiefly by the adjustment of the ohmic-drop rheostat 70, regardless of any possible error in the reactive drop component as controlled by the rheostat 50. If now, it is desired to increase the speed of the main induction motor above its synchronous speed, the rheostats 50 and 70 will be further rotated in a counter-clockwise direction so as to reverse the current in the exciting windings 35 of the regulating machine 32. The regulating machine 32 will thereupon become a generator and cause the main induction motor, in a manner well understood in the art, to operate at a speed above synchronous speed, which operation is accompanied by reversal of the phase rotation of the currents in the secondary circuit of the main induction motor and the circuit of the regulating set. Further rotation of the rheostats in the same direction will increase the resistance 51 in the exciter field circuit 44, and decrease the resistance 71 in the field circuit of the regulating machine 32, thereby repeating the phenomena already described, but in a reverse direction.

It will be noted that during the operation above synchronism, the bulbing transformer is included in the field circuit of the regulating machine. This transformer is preferably constructed with an air gap and is so arranged in phase combination as to introduce an electromotive force which will assist in the power factor correction already known to be possible by means of concatenated commutator regulating machines. Obviously, since the bulbing transformer 80 is in series with the secondary current of the main motor, its effect will be dependent upon the load upon the main motor which is exactly what is desired.

Commutator machines which are used as regulating motors in the manner herein described, are preferably provided with interpoles which are commonly excited by proper phase combinations of the compensating windings in the manner illustrated in the patent to Meyer-Delius #1,118,433, in order to overcome the so-called reactance electromotive force developed in the coils of the armature windings which are undergoing commutation. In those coils of the armature windings which are short-circuited by the brushes, harmful currents are also set up due to transformation electromotive force caused by the continual introduction and withdrawal of the alternating flux produced by the main exciting windings. In order to avoid sparking at the commutator, it is necessary to introduce a flux into the interpole which shall produce a rotation electromotive force in the short circuited coils opposing this transformation electromotive force, and balancing it as nearly as possible. This transformation electromotive force is proportional to the frequency, which is the slip frequency of the main motor, and to the magnitude of the main flux of the commutator machine. This main flux is also approximately proportional to the slip frequency for the reason that it is proportional to the rotation electromotive force of the commutator machine, which in turn is approximately proportional to the slip frequency. It therefore follows that the transformation electromotive force is proportional to the square of the slip frequency. The connections shown in the drawings will give an excitation for the interpole windings which closely approximates the value desired. It will be seen that it is made up of two components, one, which is supplied by the series transformer 37, varying with the current in the main exciting winding 35 and the other, which is supplied directly through the rheostat 50, varying with the current in the exciter field winding 44.

Because of the particular choice of the magnitude of the range employed in the arrangement shown, I find it unnecessary to reverse the current in the exciting windings 43 and 44 of the commutator exciter 40. If, however, the speed range were such that the speed were to be varied beyond a point such as that indicated by the point 16 in Fig. 6, then a reversal of the current in these windings would be necessary.

Still another arrangement embodying my invention is shown in a simplified form in Fig. 10 and in greater detail in Fig. 11. This modification differs chiefly from the one already described in the manner of connecting the exciting winding 35 of the commutator regulating machine 32. It is well understood in the art that the excitation for the commutator machine may be supplied from the slip rings of the main induction motor and controlled by means of a transformer provided with taps. Such an arrangement is shown in Fig. 10 wherein the exciting winding is connected between the brushes of the ohmic-drop exciter 60 and a regulating transformer 90, here shown as an auto-transformer, which is connected to the slip rings of the main motor 21. Interposed between the transformer and the exciting winding is the ohmic-drop rheostat 70 which has been already described. The construction and arrangement of this ohmic-drop rheostat is exactly similar to that already described and the speed of the induction motor will be controlled by controlling the connections to the taps of the transformer 90 and also by controlling the ohmic-drop rheostat 70. The voltage applied to the exciting winding 35 will now be the resultant of the voltages supplied by the transformer 90 and by the ohmic-drop exciter 60, as modified by the resistance 70. Owing to the peculiar characteristics of these systems, the control of the induction motor will be effected chiefly by controlling the component of voltage which balances the reactance drop in the field circuit of the exciting winding 35 at speeds remote from synchronism, by control of the voltage supplied by transformer 90, while at speeds near synchronism it will be controlled chiefly by the variation of the resistance 70. This transformer 90 will comprise windings 91, provided with taps 92 and contact segments 93. The operating arm 94 will preferably be mechanically connected to the operating arm 75 of the ohmic-drop rheostat, and will be arranged to connect the contact segments 93 to the taps 92, thereby varying the percentage of the voltage delivered from the slip rings of the induction motor to the exciting winding 35. In passing from operation below synchronism to operation above synchronism a reversal of the phase rotation of the currents in the secondary circuit of the main induction motor and in the circuit of the regulating motor will occur when the secondary voltage is reduced to zero and reversed due to the arrangement of the taps of the transformer 90 and the arrangement of the ohmic-drop rheostat 70. It will be noted that the interpole windings 36 of the commutator machine are in this arrangement connected between the slip rings of the main induction motor and the transformer 90. Although this transformer is conveniently constructed as an auto-transformer, it will be understood that this is not essential to my invention. Inasmuch as the theory of operation of the arrangement shown in Figs. 10 and 11 is exactly similar to that of the arrangement already described, it is not considered necessary to repeat the same in detail.

Although I have explained the mode of operation of the ohmic drop rheostat 70 to be such as to maintain the ohmic drop of the circuit comprising the field winding of the regulating machine approximately constant this mode of operation is desirable merely because the ohmic drop exciter 60 develops a substantially uniform voltage. Obviously it is necessary merely to maintain the ohmic drop approximately equal to the ohmic balancing component which the ohmic drop exciter 60 causes, indirectly in the system of Figs. 8 and 9 and directly in the system of Figs. 10 and 11, to be set up in the circuit comprising the field winding of the regulating machine and to have sufficient ohmic drop when operating in the neighborhood of synchronism so as to permit of the desired regulation by the variation thereof.

It should be noted that a portion of one component of the electromotive force applied to the field winding of the regulating machine is consumed by reason of the resistance of the winding and another portion thereof is consumed by reason of the core losses in said machine. However, for the sake of simplicity the latter portion has not hitherto been referred to in explaining my invention since, for practical purposes, it may be considered as constituting a part of the ohmic drop.

Although I have herein described two particular embodiments of my invention, by means of which the same may be practically applied, it will be understood that various modifications thereof will be evident to those skilled in the art, and, accordingly, I do not wish to be limited to the exact arrangement herein shown and described, but seek to cover in the appended claims all those modifications which come within the true scope and spirit of my invention.

What I claim as new and desire to secure by Letters Patent of the United States, is:

1. In combination, a source of supply, an asynchronous motor having its primary winding connected thereto, a commutator machine concatenated with the secondary winding of said motor, and means for exciting said machine with a flux having a frequency equal to the slip frequency of said motor and for maintaining said flux approximately constant notwithstanding variations in the speed of said motor over a range including synchronous speed.

2. In combination, a source of supply, an asynchronous motor having its primary winding connected thereto, a commutator machine concatenated with the secondary winding of said motor, means for exciting said machine with a flux having a frequency equal to the slip frequency of said motor and for automatically maintaining said flux approximately constant notwithstanding variations in the speed of said motor over a range including synchronous speeds and speeds remote from synchronism, and means for regulating the value of said flux.

3. In combination, a source of supply, an asynchronous motor having its primary winding connected thereto, a commutator machine concatenated with the secondary winding of said motor, means for causing said machine to develop a voltage having a frequency equal to the slip frequency of said motor and for maintaining the value of said voltage and the phase relation between said voltage and the slip ring voltage of said motor approximately uniform notwithstanding variations in the speed of said motor over a range including synchronous speed and speeds remote from synchronism, and means for regulating the voltage developed by said machine.

4. A speed regulating system for an asynchronous motor comprising a source of supply for said motor, a commutator machine concatenated with said motor and provided with an exciting winding, and means for impressing an electromotive force upon the circuit of said winding and for arbitrarily controlling the reactive drop and ohmic drop in said circuit.

5. A speed regulating system for an asynchronous motor comprising a source of supply for said motor, a commutator machine concatenated with said motor and provided with an exciting winding, and means for impressing an electromotive force upon said winding having a reactive drop balancing component and an ohmic drop balancing component and for arbitrarily controlling the ohmic drop balancing component.

6. A speed regulating system for an asynchronous motor comprising a source of supply for said motor, a commutator machine concatenated with said motor and provided with an exciting winding, and means for impressing an electromotive force upon said winding having a reactive drop balancing component and an ohmic drop balancing component and for arbitrarily controlling the reactive drop balancing component.

7. A speed regulating system for an asynchronous motor comprising a source of supply for said motor, a commutator machine concatenated with said motor and provided with an exciting winding, and means for impressing an electromotive force upon said winding having a reactive drop balancing component and an ohmic drop balancing component and for arbitrarily controlling said components.

8. In combination, a source of supply, an asynchronous motor having its primary winding connected thereto, a commutator machine concatenated with the secondary winding of said motor and provided with an exciting winding, and means for exciting said winding with an electromotive force having a frequency equal to the slip frequency of said motor and having an ohmic drop balancing component, which is practically independent of the slip frequency of said motor, and a reactive drop balancing component, which varies with the slip frequency of said motor.

9. In combination, a source of supply, an asynchronous motor having its primary winding connected thereto, a commutator machine concatenated with the secondary winding of said motor and provided with an exciting winding, and means for exciting said winding with an electromotive force having a frequency equal to the slip frequency of said motor and having an ohmic drop balancing component, which is practically independent of the slip frequency of said motor, and a reactive drop balancing component, which varies with the slip frequency of said motor, and for arbitrarily controlling said ohmic drop balancing component.

10. In combination, a source of supply, an asynchronous motor having its primary winding connected thereto, a commutator machine concatenated with the secondary winding of said motor and provided with an exciting winding, and means for exciting said winding with an electromotive force having a frequency equal to the slip frequency of said motor and having an ohmic drop balancing component, which is practically independent of the slip frequency of said motor, and a reactive drop balancing component, which varies with the slip frequency of said motor, and for arbitrarily controlling said reactive drop balancing component.

11. A speed regulating system for an asynchronous motor comprising a source of supply for said motor, a commutator machine concatenated with said motor, and means for exciting said machine with an electromotive force of slip frequency having an ohmic drop balancing component which is practically independent of the slip frequency and a reactive drop balancing component which varies with the slip frequency and for arbitrarily controlling said components.

12. In combination, a source of supply, an asynchronous motor having its primary winding connected thereto, a commutator machine concatenated with the secondary winding of said motor and provided with an exciting winding, and means for exciting said machine with an electromotive force having a frequency equal to the slip frequency of said motor and having an ohmic drop balancing component, which is independent of variations in the slip voltage of said motor, and a reactive drop balancing component, which varies in proportion to variations in the slip voltage of said motor, and for arbitrarily varying the proportionality between said reactive drop balancing component and the slip voltage of said motor.

13. In combination, a source of supply, an asynchronous motor having its primary winding connected thereto, a commutator machine concatenated with the secondary winding of said motor and provided with an exciting winding, and means for exciting said machine with an electromotive force having a frequency equal to the slip frequency of said motor and having an ohmic drop balancing component, which is independent of variations in the slip voltage of said motor, and a reactive drop balancing component, which varies in proportion to variations in the slip voltage of said motor, and for arbitrarily varying said ohmic drop balancing component and the proportionality between said reactive drop balancing component and the slip voltage of said motor.

14. In a speed regulating system for an asynchronous motor, the combination with a source of supply, of an induction motor having its primary winding connected thereto, a commutator machine concatenated with the secondary winding of said motor and provided with an exciting winding, means for exciting said winding with an electromotive force having a frequency equal to the slip frequency of said motor and having an ohmic drop balancing component which is practically independent of said slip frequency and a reactive drop balancing component which varies with said slip frequency, and means for simultaneously regulating the ohmic drop balancing component in proportion to the desired values of the slip of said motor and the reactive drop balancing component in proportion to the square of the desired values of the slip of said motor.

15. A speed regulating system for an asynchronous motor comprising a source of supply for said motor, a commutator machine concatenated with said motor and provided with an exciting winding and means for exciting said winding so that the reactive voltage drop in the circuit of said winding varies approximately as the slip frequency of said motor and the ohmic drop in said circuit is held substantially constant.

16. In combination, a source of supply, an induction motor having its primary winding connected thereto, a commutator machine concatenated with the secondary winding of said motor and provided with an exciting winding, means for impressing upon said winding an electromotive force, having a frequency equal to the slip frequency of said motor and a value proportional to the slip voltage of said motor, for balancing the reactive drop in said winding and for impressing upon said winding an electromotive force, having a frequency equal to the slip frequency of said motor and a value which remains approximately constant notwithstanding variations in the slip voltage of said motor for balancing the ohmic drop in said winding, and means for regulating said first mentioned electromotive force in proportion to the square of the slip of said motor and for varying the second mentioned electromotive force in proportion to the slip of said motor.

17. In combination, a source of supply, an induction motor having its primary winding connected thereto, a commutator machine concatenated with the secondary winding of said motor, a commutator exciter electrically connected to the exciting winding of said commutator machine, an exciting winding for said exciter connected to the secondary winding of said induction motor, means for controlling the current in said winding, and means for controlling the resistance in the circuit of the exciting winding of said commutator machine.

18. In combination, a source of supply, an induction motor having its primary winding connected thereto, a commutator machine connected to the secondary winding of said motor and provided with an exciting winding, a commutator exciter, means for connecting said exciting winding between said exciter and the secondary of said induction motor, means for arbitrarily controlling the ohmic drop in the circuit of said exciting winding, and means for exciting said exciter with a current of slip frequency and arbitrary magnitude.

19. In combination, a source of supply, an induction motor having its primary winding connected thereto, a commutator machine connected to the secondary winding of said motor and provided with an exciting winding, a commutator exciter, means for connecting said exciting winding between said exciter and the secondary of said induction motor, means for maintaining the ohmic drop in the circuit of said exciting winding substantially constant, means for controlling said exciter to cause the reactive drop in said exciting winding to vary approximately as the square of the slip frequency of said motor, and means for exciting said exciter with a substantially constant current of slip frequency.

20. In combination, a source of supply, an induction motor having its primary winding connected thereto, and means for regulating the speed of said motor, comprising a commutator regulating machine connected in cascade with the secondary winding of said motor and rotatably connected to an asynchronous machine which is connected to said source of supply, a commutator exciter rotatably connected to said regulating machine, means for connecting the exciting windings of said regulating machine between the brushes of said exciter and the secondary terminals of said induction motor, a variable resistance in series with said exciting winding, an exciting winding for said exciter connected to the secondary terminals of said induction motor, a resistance for controlling the current in said latter winding, another exciting winding for said exciter, and means for supplying the latter winding with a voltage of arbitrary magnitude comprising a frequency changer rotatably connected to said induction motor and supplied with current from said source of supply.

21. In combination, a source of supply and an induction motor having its primary winding connected thereto, and means for regulating the speed of said motor, comprising a commutator machine connected in cascade with the secondary winding of said motor and rotatably connected to an asynchronous machine which is connected to said source of supply, a regulating transformer connected to the secondary winding of said induction motor, means, for supplying voltage of arbitrary magnitude of the frequency of slip, comprising a frequency changer rotatably connected to said induction motor and supplied with current from said source of supply, means for connecting an exciting winding of said commutator machine between said regulating transformer and said frequency changer, and a regulable resistance in series with said exciting winding.

22. In combination a source of supply, an induction motor having its primary winding connected thereto, a commutator machine concatenated with the secondary winding of said induction motor, means for exciting said machine by an electromotive force of slip frequency having an ohmic drop balancing component which is approximately equal to the ohmic drop in the field circuit of said machine with an exciting current corresponding to the desired regulated speed of the induction motor and which is independent of the induction motor slip frequency and having a reactive drop balancing component which varies directly with the induction motor slip frequency and which remains approximately equal to the reactive drop in the field circuit of said machine with an exciting current corresponding to said desired regulated speed.

23. In combination, a source of supply, an induction motor having its primary winding connected thereto, a commutator machine concatenated with the secondary winding of said motor, means for impressing an electromotive force proportional to slip voltage upon the field circuit of said commutator machine for balancing the reactive drop therein and for impressing an electromotive force independent of the slip voltage upon said circuit for balancing the ohmic drop therein, and means for controlling the reactive drop in said circuit to regulate the speed relatively remote from synchronism and for controlling the ohmic drop in said circuit to regulate the speed relatively near to synchronism.

24. In combination, a source of supply, an induction motor having its primary winding connected thereto, a commutator machine concatenated with the secondary winding of said motor, means for varying the reactive drop in the field circuit of said commutator machine to control the speed of said motor at speeds remote from synchronism, and means for maintaining the ohmic drop in said circuit substantially constant at a value approximately equal to the ohmic drop of said circuit when the rotation electromotive force of said commutator machine is a maximum.

25. In combination, a source of supply, an induction motor having its primary winding connected thereto, a commutator machine concatenated with the secondary winding of said motor, means for varying the reactive drop in the field winding of said commutator machine approximately as the square of the slip frequency so as to control the speed of said motor at speeds remote from synchronism, and means for artificially increasing the ohmic drop in the field circuit of said commutator machine and arbitrarily holding the same at values considerably in excess of the corresponding reactive drop to thereby control the speed of said motor at speeds close to synchronism.

26. In combination, a source of supply, an induction motor having its primary winding connected thereto, a commutator machine concatenated with the secondary winding of said motor, means for varying the reactive drop in the field winding of said commutator machine approximately as the square of the slip frequency so as to control the speed of said motor at speeds remote from synchronism and means for artificially increasing the ohmic drop in the field circuit of said commutator machine and arbitrarily holding the same constant at a value considerably in excess of the corresponding reactive drop to thereby control the speed of said motor at speeds close to synchronism.

27. The method of controlling the speed of an induction motor, concatenated with a commutator machine, which consists in controlling the speed, at speeds remote from synchronism, chiefly by controlling the reactive drop in the field circuit of said commutator machine, and in controlling the speed, at speeds close to synchronism, chiefly by controlling the ohmic drop in said field circuit.

28. The method of controlling the speed of an induction motor, concatenated with a commutator machine, which consists in artificially increasing the ohmic drop balancing component of the voltage applied to the field circuit of said commutator machine, so that over the speed range close to synchronism said ohmic drop becomes the predominating component, and in then controlling the speed during this part of the range by controlling the ohmic resistance of said field circuit.

29. The method of controlling the speed of an induction motor, concatenated with a commutator machine, which consists in maintaining the ohmic drop in the field circuit of said commutator machine constant at a value substantially equal to the ohmic drop in the field winding of said machine, when the same has a maximum rotation electromotive force, and in controlling the speed at speeds close to synchronism, largely by controlling the ohmic drop component of the voltage applied to said field winding.

In witness whereof, I have hereunto set my hand this 7th day of August 1916.

JOHN I. HULL.

---

It is hereby certified that in Letters Patent No. 1,306,594, granted June 10, 1919, upon the application of John I. Hull, of Schenectady, New York, for an improvement in "Double-Range Regulating Sets for Controlling Speed of Induction Motors," errors appear requiring correction as follows: Page 6, lines 71 and 80, for the word "bulbing" read *bulging;* page 7, line 98, after the word "ohmic" insert the word *drop;* and that the said Letters Patent should be read with these corrections therein that the same may conform to the record of the case in the Patent Office.

Signed and sealed this 22d day of July, A. D., 1919.

[SEAL.]

R. F. WHITEHEAD,
*Acting Commissioner of Patents.*

Cl. 172—274.